(12) United States Patent
DeValve

(10) Patent No.: US 9,598,175 B2
(45) Date of Patent: Mar. 21, 2017

(54) MODULAR ENVIRONMENTAL AIR CONDITIONING SYSTEM

(71) Applicant: Hamilton Sundstrand Corporation, Windsor Locks, CT (US)

(72) Inventor: Timothy D. DeValve, Manchester, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 49 days.

(21) Appl. No.: 14/696,179

(22) Filed: Apr. 24, 2015

(65) Prior Publication Data

US 2016/0311540 A1    Oct. 27, 2016

(51) Int. Cl.
*B64D 13/08* (2006.01)
*F25B 11/00* (2006.01)
*B64D 13/06* (2006.01)

(52) U.S. Cl.
CPC ............ *B64D 13/08* (2013.01); *B64D 13/06* (2013.01); *F25B 11/00* (2013.01); *B64D 2013/0603* (2013.01); *B64D 2013/064* (2013.01); *B64D 2013/0611* (2013.01); *B64D 2013/0648* (2013.01); *B64D 2013/0662* (2013.01); *B64D 2013/0688* (2013.01)

(58) Field of Classification Search
CPC  B64D 13/08; B64D 2013/0603; B64D 13/06; B64D 2013/0644; B64D 2013/0688; F25B 11/00; F04B 1/06; F04B 2203/0214; F04D 25/16; F04D 27/0246; F04D 27/0269

USPC ................. 62/401, 402; 417/2, 43, 44.2, 32
See application file for complete search history.

(56) References Cited

U.S. PATENT DOCUMENTS

| | | | |
|---|---|---|---|
| 2,734,443 A | 2/1956 | Wood | |
| 3,877,246 A * | 4/1975 | Schutze | B64D 13/06 62/243 |
| 4,021,215 A | 5/1977 | Rosenbush et al. | |
| 4,261,416 A | 4/1981 | Hamamoto | |
| 4,374,469 A | 2/1983 | Rannenberg | |
| 4,430,867 A * | 2/1984 | Warner | B60H 1/32 62/172 |
| 4,829,775 A * | 5/1989 | Defrancesco | B64D 13/06 62/402 |
| 4,875,345 A | 10/1989 | Signoret | |
| 5,323,624 A * | 6/1994 | Schwalm | B64D 13/06 62/401 |
| 5,511,385 A * | 4/1996 | Drew | B64D 13/06 62/172 |

(Continued)

OTHER PUBLICATIONS

Search Report regarding related EP App. No. 16166481.8; dated Sep. 26, 2016; 7 pgs.

*Primary Examiner* — Mohammad M Ali
(74) *Attorney, Agent, or Firm* — Cantor Colburn LLP

(57) ABSTRACT

An Environmental Control System (ECS) is disclosed for providing conditioned air to a conditioned air space. The ECS includes one or more first modules, each with a turbofan engine or Auxiliary Power Unit (APU), a first heat exchanger, a first turbine, a first water collector, and a first auxiliary fan powered by the first turbine. The ECS also includes one or more second modules. Each second module includes a mixing manifold, a second heat exchanger, an optional second water collector, and a second auxiliary fan powered by a second turbine.

17 Claims, 4 Drawing Sheets

(56) References Cited

U.S. PATENT DOCUMENTS

| | | | |
|---|---|---|---|
| 6,250,097 B1* | 6/2001 | Lui | B64D 13/06 62/402 |
| 7,188,488 B2* | 3/2007 | Army, Jr. | B64D 13/08 62/401 |
| 2003/0051500 A1* | 3/2003 | Asfia | B64D 13/06 62/402 |
| 2004/0014420 A1* | 1/2004 | Bruno | B64D 13/06 454/237 |
| 2004/0112220 A1* | 6/2004 | Defrancesco | A62B 7/14 96/108 |
| 2004/0177639 A1* | 9/2004 | Army, Jr. | B64D 13/08 62/402 |
| 2005/0061911 A1* | 3/2005 | Zywiak | B64D 13/00 244/53 R |
| 2006/0059943 A1* | 3/2006 | Merritt | B64D 13/06 62/402 |
| 2006/0196216 A1* | 9/2006 | Bruno | B64D 13/06 62/402 |
| 2008/0019842 A1* | 1/2008 | Coates | B64D 13/06 417/2 |
| 2013/0160472 A1* | 6/2013 | Klimpel | B64D 13/08 62/87 |
| 2013/0277009 A1 | 10/2013 | Army | |
| 2014/0166812 A1* | 6/2014 | Ji | B64D 13/06 244/134 C |
| 2015/0053380 A1* | 2/2015 | Army, Jr. | B23H 1/00 165/166 |

* cited by examiner

MODULAR ENVIRONMENTAL AIR CONDITIONING SYSTEM

BACKGROUND OF THE INVENTION

This invention relates to environmental air conditioning systems (ECS), and more specifically to air cycle environmental air conditioning systems such as used on aircraft.

Aircraft that fly at altitudes above that at which ambient air is suitable for the health and comfort of crew and passengers are often equipped with air cycle environmental air conditioning systems. Such systems provide pressurized conditioned air or for cooling passengers, crew, and other aircraft systems and components. These air conditioning systems typically use high pressure air bled from a turbine engine or auxiliary power unit (APU). In some cases high pressure air may be provided by an electrically-powered compressor. The high pressure compressed air fed into these systems typically is at a temperature and pressure far in excess of the temperature and pressure required for conditioned air to be supplied to the cockpit and passenger cabin, so it must be expanded and cooled by the air conditioning system before it can be discharged into the aircraft cabin as conditioned air. A typical prior art ECS system is depicted in FIG. 1.

As shown in FIG. 1, in a typical environmental air conditioning system, compressed air 112 from a compressed air source (not shown) such as a turbine engine bleed or an APU bleed is cooled in a pre-heat exchanger (not shown) (also referred to in the art as a precooler heat exchanger), where it is cooled to a temperature suitable for delivery to an ECS pack 100 that is typically located in the wing of the aircraft near the fuselage. The flow of air to the ECS pack is regulated by valve 114 and directed through conduit 116 to a heat exchanger 115 (also referred to in the art as a primary heat exchanger) where heat is rejected to ambient air flowing through or across a heat absorption side of heat exchanger 115. Cooled compressed air is discharged from heat exchanger 115 to compressor 120. A portion of the air going to heat exchanger 115 can be controllably diverted through conduit 117 and control valve 119 to mix with the outlet of turbine 144 to control the temperature of the conditioned air. Compressor 120 compresses its portion of the air from heat exchanger 115, which also results in heating of the air. The further compressed air is discharged from compressor 120 through conduit 124 to heat exchanger 126 (also referred to in the art as a secondary heat exchanger) where it rejects heat to ambient air flowing through or across a heat absorption side of heat exchanger 126.

The ambient air 113 flowing through or across the heat absorption sides of heat exchangers 115 and 126 can be a ram air flow circuit from a forward-facing inlet of the aircraft. In conditions under which insufficient airflow is generated by the forward motion of the aircraft for cooling of heat exchangers 115 and 126, the air flow can be assisted by operation of fan 128. Check/bypass valve 129 allows for bypass of the fan 128 when ram air flow is sufficient for the cooling needs of heat exchangers 115 and 126. Heat exchangers 115 and 126 can share a flow path for the ambient cooling air in either a parallel or series configuration, and can be integrated into a single unit with heat exchanger 115 sometimes referred to as a primary heat exchanger and heat exchanger 126 sometimes referred to as a secondary heat exchanger. Cooled air discharged from heat exchanger 126 is delivered through conduit 132 to a heat rejection side of heat exchanger 130. In the heat rejection side of heat exchanger 130, the air is further cooled to a temperature at or below the dew point of the air and flows into water removal unit 135 where liquid water 136 condensed from the air is removed. The dehumidified air flows through a heat absorption side of heat exchanger 130 where it is re-heated before being delivered through conduit 138 to turbine 140, where work is extracted as the air is expanded and cooled by turbine 140. A portion of the air going to turbine 140 can be diverted by valve 141 if needed to allow the temperature of the air at the inlet to the heat absorption side of heat exchanger 130 to be above freezing. The cooled expanded air discharged from turbine 140 is delivered through conduit 142 to the heat absorption side of heat exchanger 130 where it provides cooling needed to condense water vapor from the air on the heat rejection side of heat exchanger 130. The air streams on the heat absorption side of heat exchanger 130 are thus reheated. Heat exchanger 130 is also sometimes referred to as a condenser/reheater, and can be integrated with water removal unit 135 in a single unit. The reheated air from conduit 142 exiting from the heat absorption side of heat exchanger 130 flows through conduit 143 to turbine 144, where it is expanded and cooled, and then discharged from the system 100 through conduit 145 to mix manifold 150 where it is mixed with recirculated cabin air 152 before being discharged to the aircraft cabin. The environment air conditioning system 100 also includes a power transfer path 147 such as a rotating shaft that transfers power to the compressor 120 and fan 128 from work extracted by turbines 140 and 144.

Prior art ECS systems such as described above rely on centralized redundant ECS packs typically located in each wing root of the aircraft near the fuselage. These systems have proven effective and reliable, but they are relatively complex systems, which drives up cost and adversely affects reliability. Additionally, the use of a ram air circuit for heat rejection adds to aircraft aerodynamic drag and takes up space on the aircraft. Also, cabin air recirculation fans and recirculation ducting take up significant space, and the need for trim air systems to manage variable thermal loads adds to control complexity and takes up more space on the aircraft.

BRIEF DESCRIPTION OF THE INVENTION

According to some aspects of the invention, an environmental air conditioning system for providing conditioned air to a conditioned air space comprises a first module comprising a turbofan engine or an auxiliary power unit (APU). The first module includes a first heat exchanger having a heat rejection side with an inlet and an outlet, with the inlet in fluid communication with compressed air bleed from the turbofan engine or the APU. Also in the first module is a first turbine having an inlet and an outlet, with the inlet in fluid communication with the outlet of the heat rejection side of the first heat exchanger. A first water collector has an inlet in fluid communication with the outlet of the first turbine, a water outlet, and an air outlet. The first module also includes a first airflow path having an inlet and an outlet, with the inlet in fluid communication with an air source. The airflow path is also in fluid communication with the heat absorption side of the first heat exchanger disposed in the airflow path. A first module auxiliary fan promotes airflow along the first airflow path, and is powered via a power transfer path (e.g., a rotating shaft) that transfers power output from the first turbine to the first module auxiliary fan.

The system also includes a second module comprising a mixing manifold having a first inlet in fluid communication with a flow of conditioned air from the conditioned air space, a second inlet in fluid communication with the air outlet of the first water collector, and an outlet. A second turbine has an inlet in controllable fluid communication with the conditioned air space and the air outlet of the first water collector. A second heat exchanger has a heat rejection side with an inlet and an outlet, with the heat rejection side inlet in fluid communication with the mixing manifold outlet, and a heat absorption side with an inlet and an outlet with the heat absorption side inlet in fluid communication with the second turbine outlet. The second module can also include an optional second water collector having an inlet in fluid communication with the second heat exchanger heat absorption side outlet, a water outlet, and an air outlet in fluid communication with the conditioned air space. A second module fan promotes airflow along a second airflow path from the mixing manifold past the heat rejection side of the second heat exchanger and the second water collector (if present) to the conditioned air space, powered by a power transfer path (e.g., a rotating shaft) that transfers power output from the second turbine to the second module fan.

In other aspects of the invention, a method of conditioning air comprises cooling compressed air from a turbofan engine or an auxiliary power unit (APU) in a heat rejection side of a first heat exchanger having a heat absorption side in fluid communication with air from a heat absorption air source to produce cooled compressed air. The cooled compressed air drives a first turbine and then is delivered to a first water collector to produce dried cooled compressed air. Power from the first turbine drives an auxiliary fan to supplement the heat absorption air source. The dried cooled compressed air from the first turbine is delivered to one or more modular air conditioners by mixing the dried cooled compressed air with air from a conditioned space in a mixing manifold of the modular air conditioner to produce a pre-conditioned air mixture. In the modular air conditioner, the pre-conditioned air mixture is cooled in a heat rejection side of a second heat exchanger to produce a cooled pre-conditioned air mixture. The cooled pre-conditioned air mixture can then be provided as conditioned air, or can be dried in an optional second water collector to produce conditioned air for the conditioned space. A second turbine is driven with air from the conditioned space or with a portion of the dried cooled compressed air from the first module, and exhaust from the turbine is delivered to a heat absorption side of the second heat exchanger. Power produced by the second turbine drives a module fan to promote airflow from the mixing manifold past the heat rejection side of the second heat exchanger and the second water collector to the conditioned space.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying figures, in which:

DETAILED DESCRIPTION OF THE INVENTION

Figure 1:
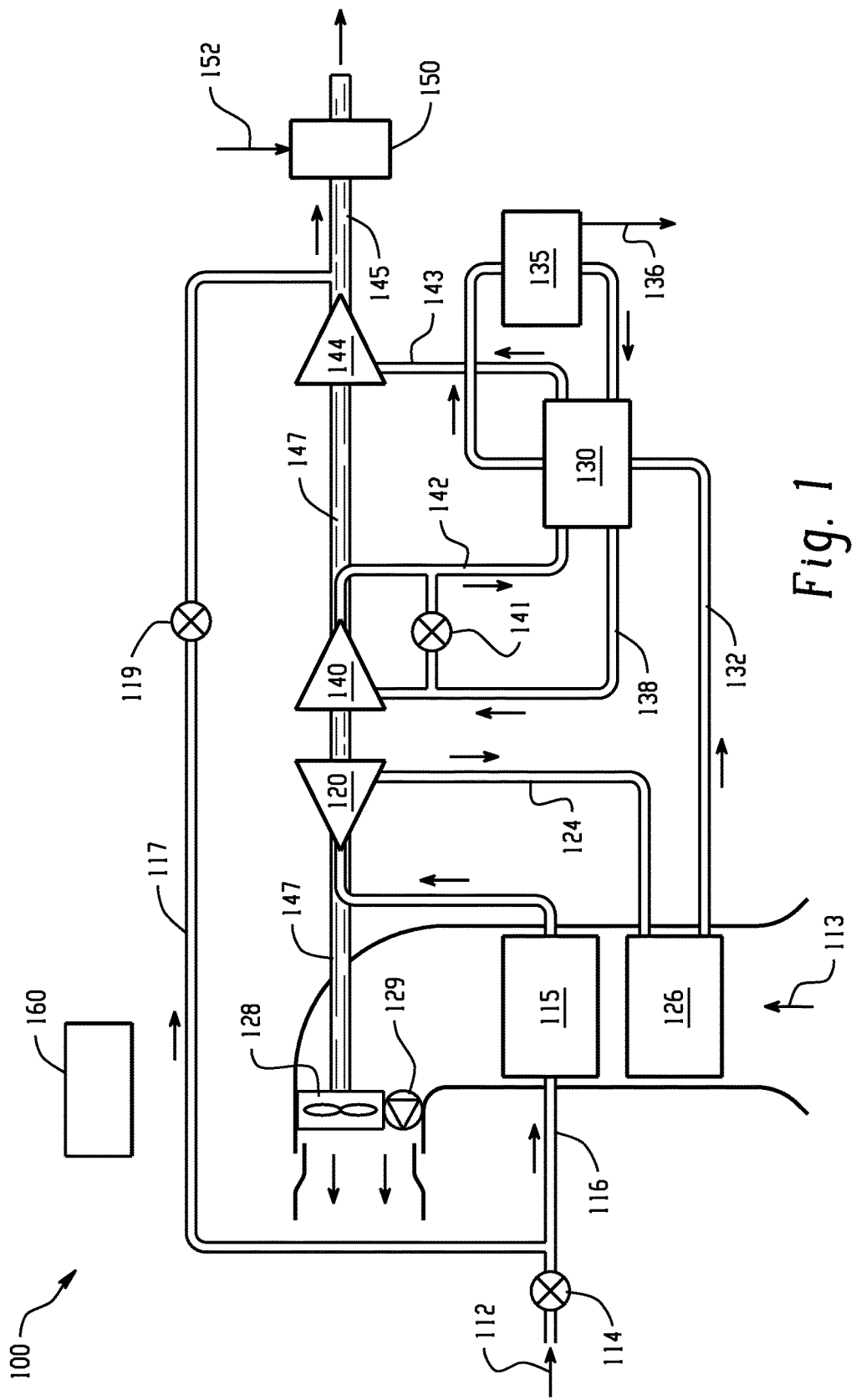
FIG. 1 is a schematic depiction of a prior art environmental conditioning system.
Figure 2:
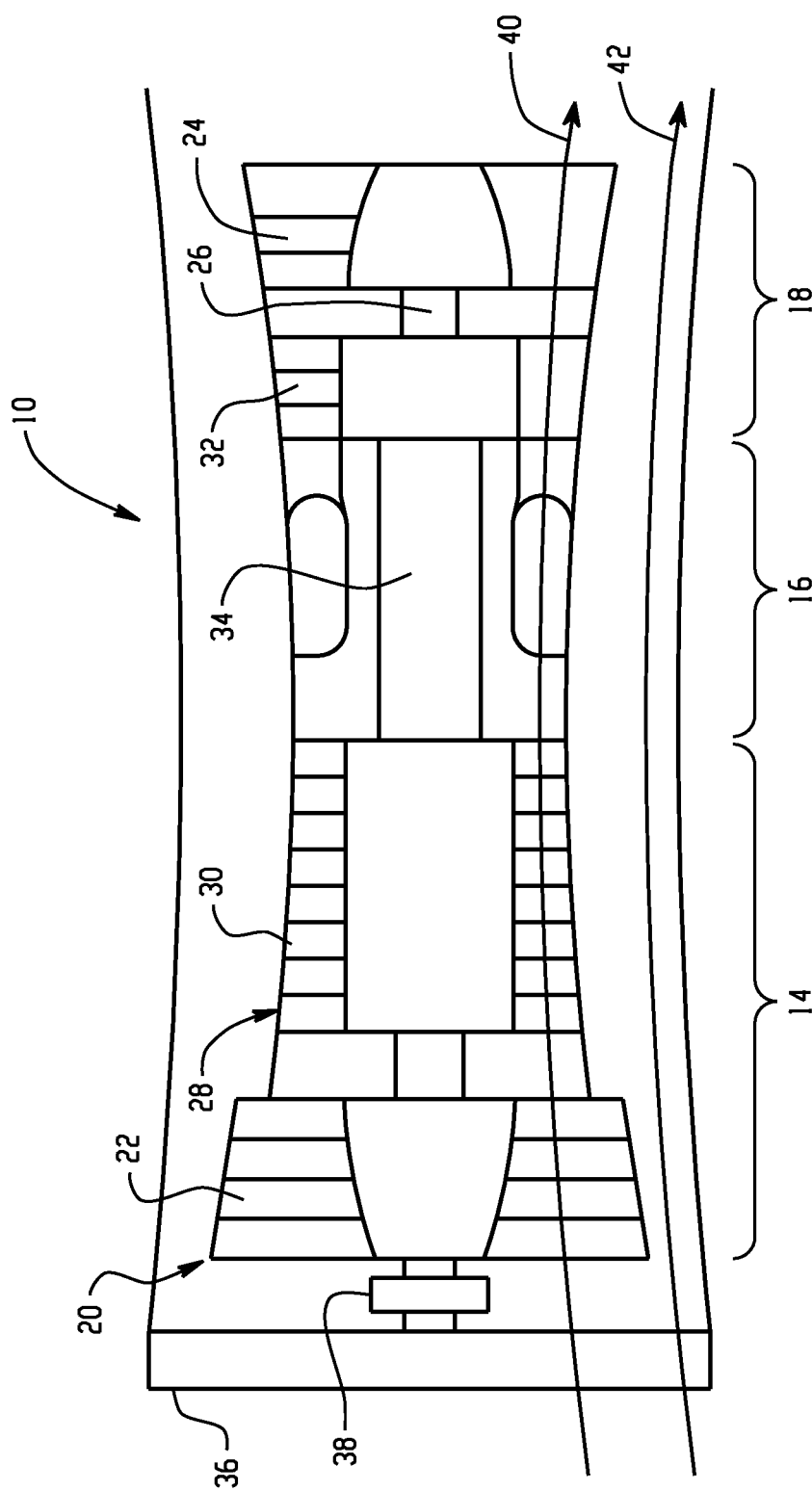
FIG. 2 is a schematic depiction of a turbine fan engine.

With reference to the Figures, FIG. 2 schematically depicts an exemplary turbine fan engine 10. As shown in FIG. 2, a gas turbine engine 10 includes a compressor section 14, combustor section 16, and turbine section 18. Low pressure spool 20 (which includes low pressure compressor 22 and low pressure turbine 24 connected by low pressure shaft 26) and high pressure spool 28 (which includes high pressure compressor 30 and high pressure turbine 32 connected by high pressure shaft 34) each extend from compressor section 14 to turbine section 18. Propulsion fan 36 is connected to and driven by low pressure spool 20. A fan drive gear system 38 may be included between the propulsion fan 36 and low pressure spool 20. Air flows from compressor section 14 to turbine section 18 along engine gas flow path 40. Air driven by the fan 36 flows within bypass housing 42 along fan bypass gas flow path 44. In alternative embodiments, the environmental control systems described herein can include an APU. An APU can also be schematically represented by FIG. 2, with the fan bypass 42 configured to produce an airflow suited for the purposes of the APU instead of for producing thrust. Alternatively, an APU can be configured without a fan bypass in some embodiments described herein. The general construction and operation of gas turbine engines and APU's is well-known in the art, and does not require further detailed description herein.

Figure 3:
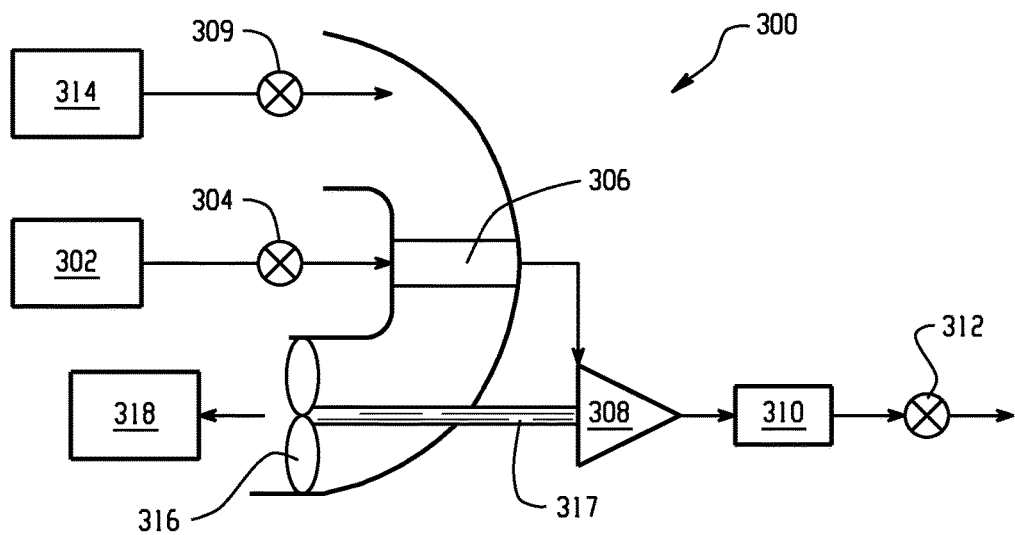
FIG. 3 is a schematic depiction of a first module as further described herein.

Turning now to FIG. 3, an exemplary embodiment of a system that can be employed as a first module 300 is schematically depicted. As shown in FIG. 3, compressed air from a compressed airflow source 302 such as a bleed or multiple bleeds from the compressor section of a turbine fan engine or an APU is directed through control valve 304 to the heat rejection side of a first heat exchanger 306, which can also be referred to as a pre-heat exchanger or 'pre-HX', where it is cooled. The cooled compressed air exiting the first heat exchanger 306 is directed to a first turbine 308 where it is expanded and further cooled. In some embodiments, air leaving the first turbine 308 is controlled to a temperature slightly above freezing by modulating the air flow through the heat absorption side of the first heat exchanger 306 via regulating valve 309. The air leaving the turbine can be in a thermodynamic condition for water to condense, so it is directed to a water collector 310 (e.g., an array or bank of tubular inertial particle separators) where any water is removed to produce a dried cooled compressed air, which is discharged from the first module 300 through control valve 312.

A heat absorption side of the first heat exchanger 306 is in fluid communication (i.e., in contact with a flowing fluid) with an air source 314, and is configured to provide an airflow path in fluid contact with the heat absorption side of the first heat exchanger 306. The air source 314 can also be a fan powered by an APU. In some exemplary APU configurations, a fan powered by the APU can be integrated with the APU engine assembly to direct air along a fan bypass airflow path similar to a bypass on a turbofan engine to provide the air source 314. In some exemplary APU configurations, a fan powered by the APU can be connected to an APU engine assembly by a power transfer path (e.g., rotating shaft), and can direct non-bypass air along the airflow path past the first heat exchanger 306. As used herein, non-bypass air is air drawn from a location that is not integrated with the APU intake. In some exemplary APU configurations, an electric powered fan can direct non-bypass air along the airflow path through the first heat exchanger 306. Airflow along the airflow path from the air source 314 through the first heat exchanger is promoted by a first auxiliary fan 316 powered by the first turbine 308 through power transfer path 317. After flowing past or through the heat absorption side of first heat exchanger 306, air from the air source 314 is returned to air return 318. In embodiments where the first module includes a turbofan engine, the air source 314 can be from the engine fan 36 and the air return 318 can be the fan bypass 42, whereby the energy recovered by the first turbine 308 and transferred to the first auxiliary fan 316 is returned to the fan bypass. In embodiments where the first module includes an APU, energy recovered by the first turbine 308 and transferred to the first auxiliary fan 316 will provide reduced energy requirements on the APU or associated aircraft electrical systems.

Figure 4:
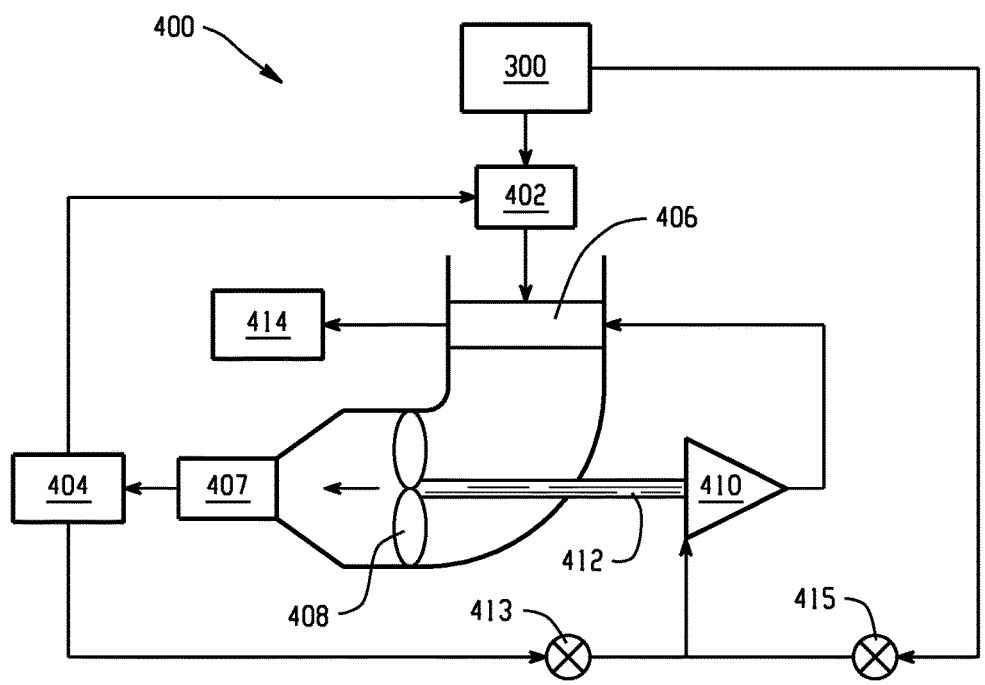
FIG. 4 is a schematic depiction of a second module as further described herein.

Air discharged from the first module 300 through control valve 312 can be directed to one or more second modules. In some exemplary embodiments, the air discharged from the first module 300 can range in temperature from about 30° F. to 40° F. at a pressure of about 16-17 psi. An exemplary second module 400 is schematically depicted in FIG. 4. As shown in FIG. 4, air received from the first module 300 is received by mixing manifold 402 where it is mixed with air from a conditioned space 404 such as an aircraft cabin or cockpit to form a pre-conditioned air mixture. The preconditioned air mixture flows along a second airflow path in fluid communication with a heat rejection side of second heat exchanger 406, where it is cooled before being dried in second water collector 407 and discharged to the conditioned space 404. Airflow along the path from the mixing manifold 402 past the heat exchanger 406 to the conditioned space 404 is promoted by a second modular fan 408 disposed along the airflow path. The second modular fan 408 is powered by a second turbine 410 through power transfer path 412. Second turbine 410 is driven by air from the conditioned air space 404 through control valve 413 or by the dried cooled compressed air from first module 300 through control valve 415, or by a combination of both. For aircraft applications, the pressure differential between the conditioned space 404 and the exhaust 414 should be sufficient at high altitude to drive the second turbine 410. On the ground or at low altitude, dried cooled compressed air from first module 300 can be used to drive the second turbine 410. The exact altitude where the inlet of second turbine 410 can switch between the conditioned space and the first module 300 will depend on system-specific design parameters, but will generally fall in the range of ten to fifteen thousand feet. After reduction of pressure and extraction of work by the second turbine 410, air from the turbine outlet has been cooled to a temperature sufficiently low (e.g., <0° F.) to act as a heat sink on the heat absorption side of second heat exchanger 406. After exiting the heat absorption side of the second heat exchanger 406, the air flows to exhaust 414. Exhaust 414 can be an outside exhaust on the ground or at high altitude, although in some exemplary embodiments, on the ground or at low altitude the air exhaust 414 can be returned to the airstream just upstream of the conditioned air space 404.

The thermal capacity of the second module can be controlled by 1) modulating valves 413 and 415 or 2) designing the second module to deliver air at a relatively constant flow and temperature and adding an electric heater downstream of the second water collector 407. In addition, when there is a plurality of second modules, each second module can deliver air to a dedicated portion of the conditioned space, or one or more of the second modules can be connected via a manifold that allows for control of thermal capacity by modulating valves 413 and 415 to control the contribution of flow and temperature by each module to the manifold.

Figure 5:
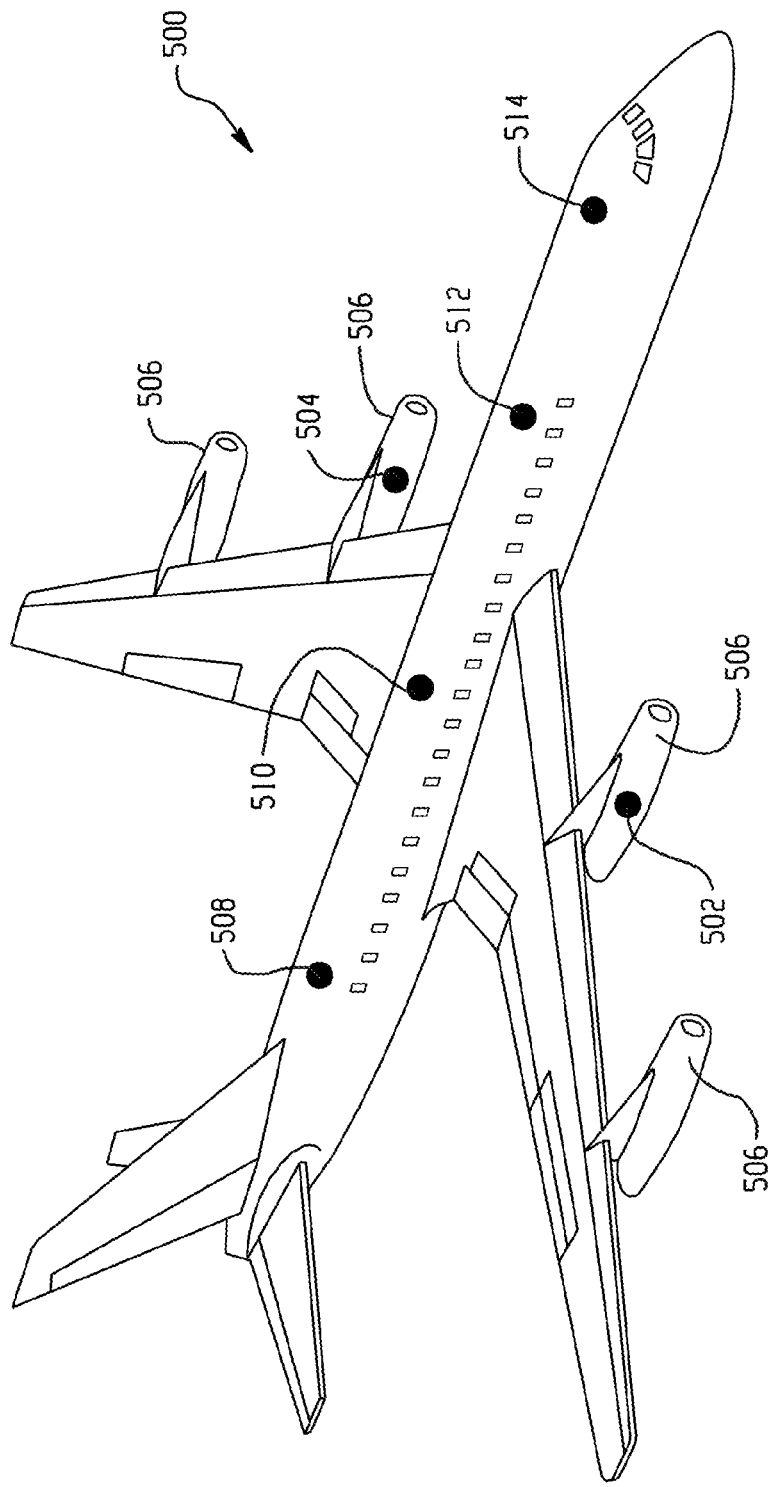
FIG. 5 is a schematic depiction of an aircraft having first and second modules as further described herein.

Turning now to FIG. 5, an exemplary configuration for deployment of a modular environmental control system on an aircraft is schematically depicted. As shown in FIG. 5, aircraft 500 has first modules 502 and 504 deployed on different turbofan engines 506. Second modules 508, 510, 512, and 514 are deployed along the aircraft fuselage, and in some embodiments can be controlled based on climate conditions in zones of the conditioned space associated with each of the second modules 508, 510, 512, and 514. The selection of four as the number of second modules illustrated in FIG. 5 is arbitrary for illustrative purposes, and the actual number can be fewer down to a single second module, or greater up to practical limits imposed by diminishing returns. Also, the second modules need not all be sized to the same capacities, depending on the requirements of the zone to which they are associated. For example, a pressurized cargo space can have different requirements than passenger cabins. Additionally, lower density first class seating can impose different thermal loads than higher density coach seating, and the systems described herein allow for optimization of the second module design parameters and placement for the particular zone application.

Two first modules 502 and 504 are illustrated to provide redundancy, but it is contemplated that systems can be designed and configured to operate with only a single first module. Unlike prior art system configurations, which can require 100% parallel redundant systems for aircraft applications in order to meet operational parameters if one of the systems fails during flight, the systems described herein can be configured so that only the first modules require full parallel redundancy. Redundancy for the second modules can be designed into the system so that the system can selectively operate in a first mode where all of a plurality of second modules are operated, or in a second mode where fewer than all of the second modules are operated. The first mode can be configured to provide optimum environmental control for the system, and the second mode can be configured to meet operational parameters without being constrained to maintain optimum efficiency. Of course, the system is not limited to having only one or two first modules provided that additional turbofan engines are available, and the number of both first and second modules can be varied during system design to achieve targeted overall system capacity, efficiency, and payload.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An environmental air conditioning system for providing conditioned air to a conditioned air space, comprising:
a first module comprising:

a turbofan engine or an auxiliary power unit (APU);
a first heat exchanger having a heat rejection side with an inlet and an outlet, with the inlet in fluid communication with compressed air bled from the turbofan engine or the APU;
a first turbine having an inlet and an outlet, the inlet in fluid communication with the outlet of the heat rejection side of the first heat exchanger;
a first water collector having an inlet in fluid communication with an outlet of the first turbine, a water outlet, and an air outlet;
a first airflow path having an inlet and an outlet, with the inlet in fluid communication with an air source, and with a heat absorption side of the first heat exchanger disposed in the airflow path;
a first module auxiliary fan that promotes airflow along the first airflow path; and
a power transfer path that transfers power from the first turbine to the first module auxiliary fan; and
a second module comprising:
a mixing manifold having a first inlet in fluid communication with a flow of conditioned air from the conditioned air space, a second inlet in fluid communication with the air outlet of the first water collector, and an outlet;
a second turbine having an inlet in controllable fluid communication with either or both of the conditioned air space and the air outlet of the first water collector;
a second heat exchanger having a heat rejection side with an inlet and an outlet, with the heat rejection side inlet in fluid communication with the mixing manifold outlet, and a heat absorption side with an inlet and an outlet, with the heat absorption side inlet in fluid communication with the second turbine outlet; and
a second module fan that promotes airflow along a second airflow path from the mixing manifold past the heat rejection side of the second heat exchanger to the conditioned air space
a power transfer path that transfers power from the second turbine to the second module fan.

2. The system of claim 1, wherein the first module comprises the turbofan engine.

3. The system of claim 2, wherein the air source is a fan bypass of the turbofan engine, and the first auxiliary fan promotes return of air from the first airflow path to the fan bypass of the turbofan engine.

4. The system of claim 1, wherein the first module comprises the APU.

5. The system of claim 4, wherein the air source is a fan bypass of the APU, an APU-powered fan that directs non-bypass air to the first airflow path inlet, or an electric-powered fan that directs non-bypass air to the first airflow path inlet.

6. The system of claim 1, comprising a plurality of said second modules.

7. The system of claim 6, wherein each of the plurality of second modules is independently controlled based on conditions in a different zone of the conditioned space.

8. The system of claim 6, wherein the system is configured to be operated in a first mode with all of the plurality of second modules or in a second mode with fewer than all of the plurality of second modules.

9. The system of claim 6, comprising a plurality of first modules operatively connected to the plurality of second modules.

10. The system of claim 9, wherein the system is configured to be operated with either all of the plurality of first modules or in a second mode with fewer than all of the plurality of first modules.

11. The system of claim 1, wherein the second module further comprises a second water collector having an inlet in fluid communication with the second heat exchanger heat absorption side outlet, a water outlet, and an air outlet in fluid communication with the conditioned air space.

12. An aircraft comprising the system of claim 1, wherein the second turbine inlet is in fluid communication with the conditioned airspace at high altitude and is in fluid communication with the air outlet of the first water collector on the ground.

13. An aircraft comprising the system of claim 1, wherein the heat absorption side outlet of the second heat exchanger is in fluid communication with an inlet to the conditioned air space on the ground, and exhausts to atmosphere at high altitude.

14. A method of conditioning air, comprising:
cooling compressed air from a turbofan engine or an auxiliary power unit (APU) in a heat rejection side of a first heat exchanger having a heat absorption side in fluid communication with air from an air source to produce cooled compressed air;
driving a first turbine with the cooled compressed air and then delivering the cooled compressed air to a first water collector to produce dried cooled compressed air;
driving an auxiliary fan with power from the first turbine to supplement the air source;
delivering at least a portion of the dried cooled compressed air to one or more modular air conditioners by mixing the dried cooled compressed air with air from a conditioned space in a mixing manifold of the modular air conditioner to produce a pre-conditioned air mixture;
cooling the pre-conditioned air mixture in a heat rejection side of a second heat exchanger to produce a cooled pre-conditioned air mixture;
driving a second turbine with air from the conditioned space or with a portion of the dried cooled compressed air, and delivering exhaust from the turbine to a heat absorption side of the second heat exchanger; and
driving a module fan with power from the second turbine to promote airflow from the mixing manifold past the heat rejection side of the second heat exchanger to the conditioned space.

15. The method of claim 14, comprising driving the second turbine with a portion of the dried, cooled compressed air on the ground and driving the second turbine with air from the conditioned space at high altitude.

16. The method of claim 14, comprising exhausting the heat absorption side of the second heat exchanger to atmosphere at high altitude, and delivering output from the heat absorption side of the second heat exchanger to the conditioned space on the ground.

17. The method of claim 14, further comprising drying the cooled pre-conditioned air mixture in a second water collector to produce conditioned air for the conditioned space.

* * * * *